April 30, 1940.  A. E. CHESLER  2,198,862
SAFETY DEVICE FOR VEHICLES
Filed July 28, 1938  3 Sheets-Sheet 1
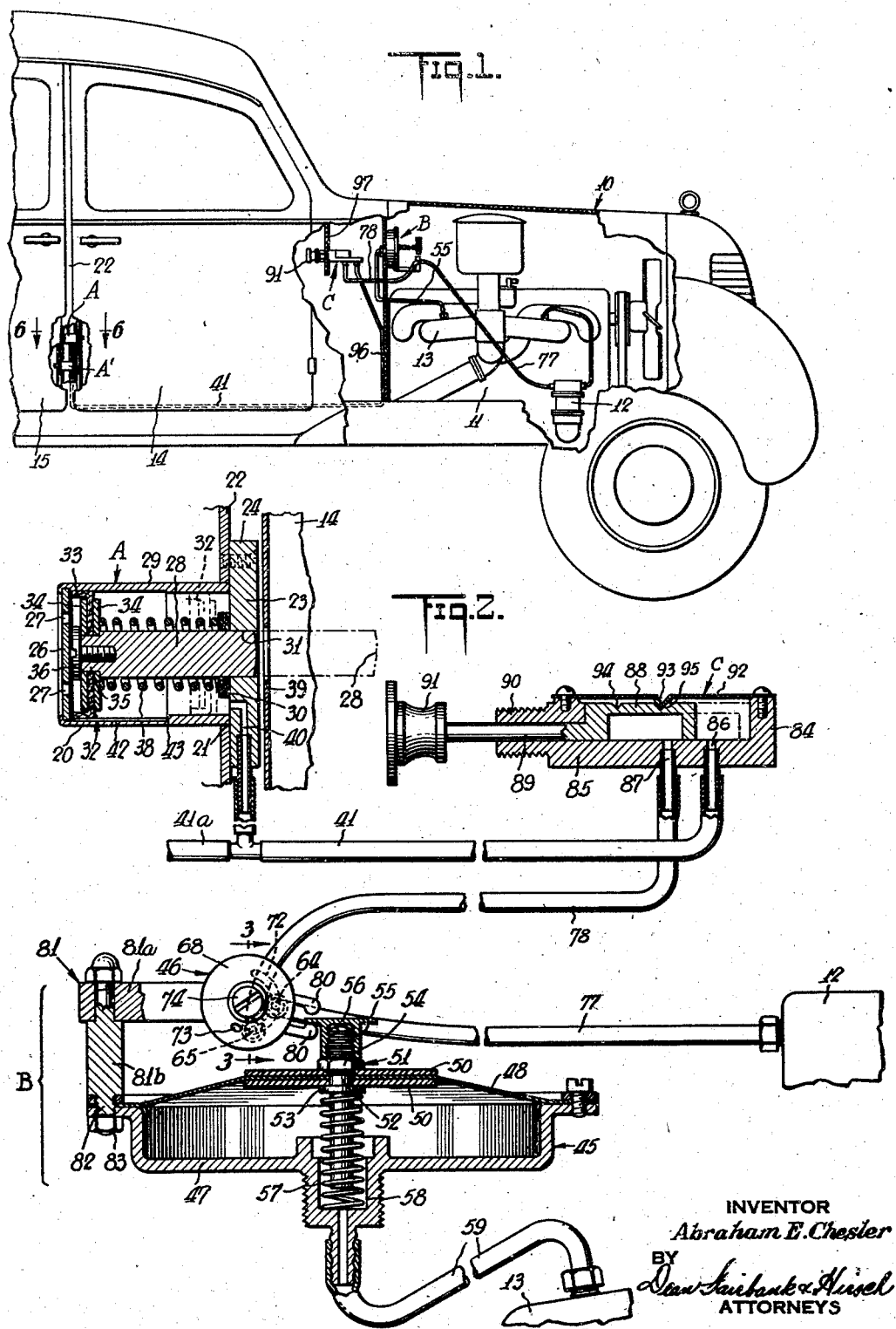
INVENTOR
*Abraham E. Chesler*
BY
ATTORNEYS

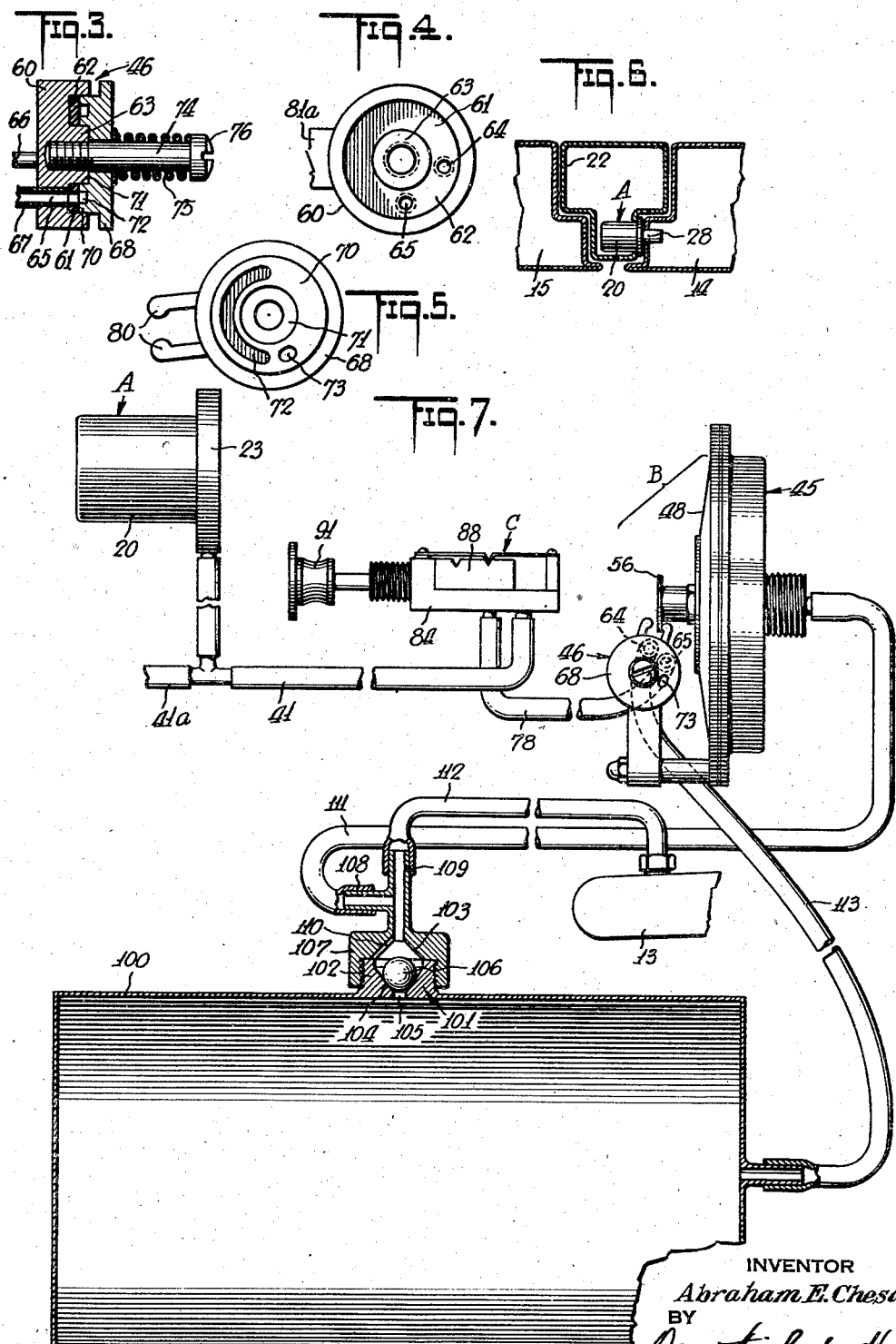

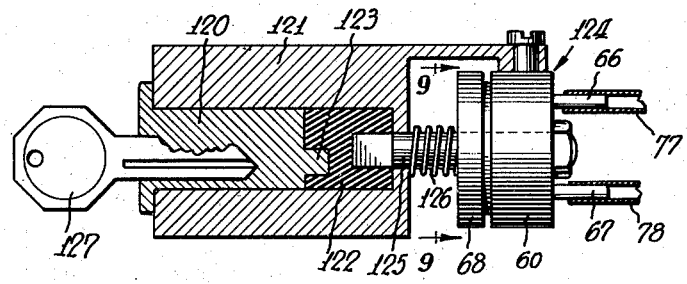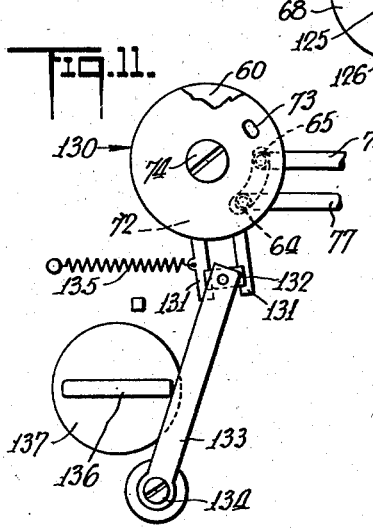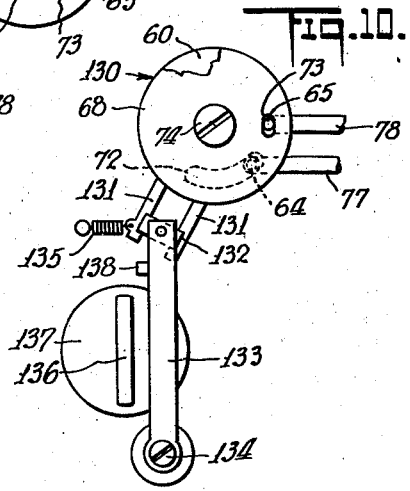

Patented Apr. 30, 1940

2,198,862

UNITED STATES PATENT OFFICE 2,198,862

SAFETY DEVICE FOR VEHICLES

Abraham E. Chesler, Woodmere, N. Y.

Application July 28, 1938, Serial No. 221,810

19 Claims. (Cl. 180—82)

The present invention relates to a door control, and more particularly to an automatic safety door lock for motor vehicles.

Many persons with small children purchase two-door sedans as a safeguard against injury or death to the children, resulting from accidental opening of the doors, although under ordinary circumstances, they would prefer four-door cars. By the present invention, accidental or inadvertent opening of the doors of a car is obviated, and other advantages are attained, as will be hereinafter described.

One object of the present invention is to provide simple and effective means, easily installable in a conventional motor car, for automatically locking its doors once they are shut, and keeping them locked as long as desired, while the car is in motion, or while its motor is operating, but in which automatic release of the lock is assured immediately after the motor is shut down.

Another object is to provide a safety door lock of the general character described, which is controlled by vacuum created by the operation of the motor, and which is not affected in its automatic operation by reduction in the vacuum created in the intake manifold of the running motor.

Another object is to provide a safety door lock device of the general character described, which can be operated in conjunction with the standard type of automatic vacuum booster, to maintain a substantially uniform or stabilized vacuum condition in the system controlling said device.

In the accompanying drawings, in which are shown various possible embodiments of the several features of the invention:

Fig. 1 is a side elevation with parts broken away, showing one embodiment of my invention in door locking position, installed in a conventional type of motor vehicle, having a standard form of automatic vacuum booster, Fig. 2 is a view, partly in section, of the embodiment of my invention illustrated in Fig. 1, and shows the various units thereof on a somewhat enlarged scale and in greater detail, and the door lock in released position, Fig. 3 is a detailed section of one of the valve units taken on line 3—3 of Fig. 2, Fig. 4 is a front view of one part of the valve unit shown in Fig. 3, Fig. 5 is a rear view of another part of the valve unit shown in Fig. 3, Fig. 6 is a detailed section taken on line 6—6 of Fig. 1, but shown on a somewhat enlarged scale, and with the door lock in locking position, Fig. 7 is a view, partly in section, of another embodiment of my invention, for use on a motor vehicle, having no automatic vacuum booster, Fig. 8 is a section through another embodiment, operating in conjunction with the ignition system of an automobile, Fig. 9 is a section taken on line 9—9 of Fig. 8, Fig. 10 is a front view somewhat diagrammatic of another embodiment operating directly from the ignition switch key, and shown in inoperative position with the ignition shut off, and Fig. 11 is a front view corresponding to that of Fig. 10, but showing the device in operative position with the ignition turned on.

Referring now to Figs. 1 to 6 of the drawings, the invention is shown installed on a conventional automobile 10, having a motor 11, provided with a standard type of vacuum booster (usually associated with the fuel pump) for operating the windshield and other accessories (not shown), free from the effect of any such vacuum reduction in the intake manifold 13 of the running motor, as occurs for example when the throttle is opened wide, as for instance in climbing a steep hill.

Operated from the vacuum booster 12 is a safety lock A for the front automobile door 14, a similar lock A' being diagrammatically shown for the rear door 15. Disposed in the vacuum system of the safety door locks A and A' is an automatic release mechanism B, serving to interrupt the vacuum in said system immediately upon a shut-down of the motor 11, so that there is no delay in the release of said locks, as would occur, especially with a booster in the system, if said release depended on the gradual extinction of the vacuum in the system, after a motor shut-down.

Between the safety locks A and A', and the automatic release device B, is a manually operable cut-off switch or valve C, for opening the vacuum system to the atmosphere when desired, so that said locks may be immediately released and rendered inoperative irrespective of the operation of the motor.

Referring now to the details of the various units, the safety lock device A is of such simple and compact construction, as to permit it to be easily mounted in the conventional type of hollow door jamb 22, with its restricted internal space, while affording the maximum amount of motive force for locking or unlocking operations. For that purpose, the lock device comprises a cylinder 20, desirably having a diameter of about one inch, and extending into the interior of the door jamb 22, through a hole 21 in a wall thereof.

Welded or otherwise sealably secured to one end of the cylinder 20 is a head plate 23, presenting a flange 24 for threaded stud attachment to the outer side of the door jamb 22, and secured to the other end of said cylinder is a head plate 26, provided with airports 27 communicating with the atmosphere for the purpose hereinafter made apparent.

Extending axially in the cylinder 20 is a locking bolt 28, one end of which passes through a felt packing or sealing ring 30 on the inner side of the head plate 23, and through an opening 31 in said plate. The other end of the locking bolt 28 is connected to a piston 32, desirably comprising a leather cup washer 33, having fluid tight engagement with the inner peripheral surface of the cylinder 20, and clamped between two rigid washers 34. These washers encircle the reduced end 35 of the bolt 28, and are held in clamped position by a screw stud 36.

The locking bolt 28 is urged into door releasing position shown in full lines in Fig. 2, by a coil spring 38, encircling said bolt, and is moved towards the right and through a door opening 39 into locking position by differential pressure, on opposite sides of the piston 32 when the motor is running. In order to create the desired differential pressure, the cylinder chamber on the right of the piston 32 is in fluid connection with the vacuum system by a passageway 40, leading into said chamber, and connected at its outer end to one end of a pipe 41, which forms part of the vacuum transmission line, and which has a branch connection 41a to the other lock device A'. Since the cylinder chamber on the other side of the piston 32 is under atmospheric pressure through airports 27, the differential pressure produced by the operation of the motor 11, will move the bolt 28 into door locking position shown in dotted lines in Fig. 2.

The opening 39 on the door is desirably made larger in diameter than that of the bolt 28, so that the slide movement of said bolt through said opening during door locking operations is not affected by the sagging or mis-alignment of the door. This construction also avoids frictional resistance to the slide movement of the bolt 28 through the opening 39.

In order to permit quick return of the locking bolt 28 into released position, the internal periphery of the cylinder 20 at its left hand part 29 is slightly enlarged in diameter, and is provided with an internal groove 42, affording communication between the extreme left hand end of said cylinder, and the right hand end 43 of said enlarged part. The tension of the spring 38 is such, that when the motor 11 is running, the piston 32 extends to the right beyond the point 43 of the cylinder 20 in door locking position. As soon as the piston 32 reaches point 43 in its travel to the left after motor shut-down, the cylinder enlargement reduces the frictional resistance between the leather cup 33 and the cylinder walls, and thereby permits a quick return of the locking bolt into released position. Once the piston 32 passes to the left of point 43, the fluid pressure on both sides of said piston is equalized by means of the groove 42, and a more rapid return of the locking bolt 28 under the influence of the coil spring 38 is effected.

The necessary lubrication for the slide movement of the piston 32 is desirably supplied by the ring 30, soaked with a lubricant for that purpose, and by a suitable felt washer (not shown) impregnated with oil or grease, and clamped between the leather washer 33 and one of the metal washers 34.

When the car is first started, the idling of the motor creates a maximum amount of vacuum, so that the groove 42 does not interfere with the drawing of the bolt 28 into locking position.

The release device B automatically puts the vacuum system under atmospheric pressure immediately after motor shut-down, so that the quick release of the bolt 28 is assured. This device comprises a diaphragm valve actuator 45, controlled by the suction of the intake manifold 13, and adapted to operate a vacuum relief valve 46 for the system.

The diaphragm valve actuator 45 comprises a rigid valve casing 47, sealed at one end by an impervious flexible diaphragm 48, clamped centrally between two rigid washers 50 to which is affixed a plunger unit 51 for operating the valve 46. In the specific form shown, this unit 51 comprises a screw 52 having a collar 53 abutting the lower washer 50. Threaded onto the outer portion of the screw 52, and screwed tightly against the upper washer 50 is a nut 54. Threaded onto the upper projecting portion of the screw 52 is a cap 55, terminating at its upper end in a flange head 56. This cap 55 may be held in position against rotation by screwing it tightly against the nut 54, as shown, or by means of a lock nut or a cotter pin (not shown).

The diaphragm 48 is urged outwardly by means of a coil spring 57, seated at one end in a socket 58 formed in the valve casing 47. At the other end, the coil spring 57 encircles the inner end of the screw 52 and abuts the collar 53. This spring 57 and the cap 55 are supported against transverse bending and tilting respectively by the lower end of the screw 52, extending axially into said spring and into the socket 58.

The interior of the valve casing 47 is in communication with the intake manifold 13 by means of a connection 59, so that the differential pressure on opposite sides of the diaphragm 48, while the motor 11 is running, forces said diaphragm inwardly against the action of the spring 57 as shown. When the motor 11 is shut down, the resulting interruption of the vacuum in the valve casing 47 causes the diaphragm 48 to move outwardly under the action of the spring 57 from the position shown, and causes the plunger unit 51 to operate the vacuum relief valve 46, so that the portion of the vacuum system leading to the door locks A and A' is opened to the atmosphere.

The effective diameter of the diaphragm 48 is several times that of the lock cylinder 20, so that even when the suction in the manifold is but slight, it will yet be effective to move the valve plate 68 and close the vent, wherefore, effective suction is promptly applied to the lock operating cylinder and the doors are promptly locked. The vacuum in the intake manifold 13 must fall to practically zero, as it does when the motor is shut down, before the diaphragm 48 will move outwardly into vacuum releasing position.

The vacuum release valve 46 comprises a valve casing 60, having an annular recess 61, which extends around a central boss 63, and which is base lined with a resilient washer 62 forming a valve seat. A pair of spaced ports 64 and 65 extend through the recessed section of the casing 60, and through the resilient disc 62, and communicate with a pair of nipples 66 and 67 respectively, press-fitted or otherwise secured in said ports, so as to project outwardly from the rear side of said casing. The nipple 66 is connected to a pipe 77 leading to the booster 12, and the nipple 67 is connected to a pipe 78 directed to cylinder 20 by way of the cut-off valve C.

Cooperating with the valve casing 60 is a rotary valve plate 68, having an annular rib 70, extending into the recess 61 with a close rotary fit, and also having a central bore 71 to form a bearing in said plate for the boss 63 of said casing. This rib 70 has a segmental groove 72, adapted to sealably enclose the inner ends of the two ports 64 and 65 as shown, and an airport 73, desirably of slightly elongated cross-section, spaced from one end of said groove, and extending the full thickness of said plate.

The valve plate 68 is urged axially into position to seat the rib 70 sealably against the resilient disc 62. For that purpose there is provided a screw 74, passing loosely through the valve plate 68, and threaded at one end into the boss 63. Encircling this screw 74 is a coil spring 75, one end of which abuts the valve plate 68, the other end abutting the screw head 76. This screw head 76 may be turned to adjust the tension of the spring 75.

The rotary plate 68 has a pair of spaced fingers 80, between which extends the flange head 56 of the plunger unit 51, so that axial movement of said plunger head is translated into a rotary valve movement of said plate. The flange head 56 has a small play between the two fingers 80 to permit slight vibratory movement of the diaphragm 48 without effecting changes in the operation of the system.

The valves 45 and 46 are coupled together into a unit by a frame structure 81, one bracket arm 81a of which is connected to the rear side of the valve base or casing 60 by any suitable means, as for instance screws (not shown), the other bracket arm 81b desirably having a threaded portion 82 which passes through the flange of the valve casing 45 and which receives a suitable nut 83.

As long as the motor is operating, the valve plate 68 will be in closed position shown, with the groove 72 sealably enclosing the inner ends of the ports 64 and 65. In this position of the valve plate 68, the vacuum in the pipe 77 will be transmitted to the pipe 78, so that the locking devices A and A' will be in door locking position, assuming of course that the cut-off valve C is closed, and in position reversed from that shown. As soon as the motor is shut down, the resultant outward or upward movement of the diaphragm 48 causes the flange head 56 of the plunger 51 to move upwardly, and its engagement with the upper finger 80 of the valve plate 68 causes said plate to rotate in a counter-clockwise rotation as viewed in Fig. 2, until the airport 73 is in registry with the port 65 communicating with the cut-off valve C. In this position of the valve plate 68, the air entering the port 73 will immediately find its way into the pipe 78, while the port 64 will still have its inner end sealably closed by the groove 72 of the valve plate 68, and out of communication with the air. Since all of the air entering the airport 73 will be directed towards the pipe 78, the vacuum in the locking device will be immediately interrupted, and the locking bolt 28 returned into inoperative position without delay.

As soon as the motor is restarted, the diaphragm 48 will return into inward position shown, thereby causing the return of the valve plate 68 to the position shown, with the inner ends of the two ports 64 and 65 sealably connected by the groove 72 of said plate. In this returned position, the vacuum between the two pipes 77 and 78 will be re-established.

The manually operable cut-off switch C is disposed between the automatic release device B and the locking devices A and A', and comprises a frame structure 84 with a base 85, having a pair of ports 86 and 87 connected to the pipe connections 41 and 78 respectively. Slidable over this frame base 85 is a valve chest 88, having a valve stem 89 which is guided in a sleeve portion 90 of the frame structure 84, and which carries at its outer end a suitable knob 91 by which said valve chest 88 may be manually moved along said base. Extending over the valve chest 88, and secured to the frame structure 84, is a spring plate 92, formed with a V-shaped depression 93, which frictionally engages the top of said chest, and which is adapted to snap into either one of two V-shaped notches 94 and 95, on the top of said valve chest, to hold said chest in either one of its two predetermined positions.

The frame structure 84 is open on its sides, so that when the valve chest 88 has been drawn into the position shown in full lines in Fig. 2, the port 86 will be open to the atmosphere. Under these conditions the pipe 41, and the cylinder chamber on the right side of the piston 32, will be under atmospheric pressure, thereby causing the bolt 28 to be moved into released position.

In order to re-establish the vacuum in the locking devices A and A', the knob 91 is pushed inwardly towards the right, until the spring depression 93 snaps into the notch 94. In this position, the two ports 86 and 87 will communicate with the interior of the valve chest 88, so that whatever vacuum exists in the pipe 78 will be transmitted to the pipe 41, and in turn to the locking devices A and A', so that said devices will return to locking position, provided the motor is still running.

In mounting the apparatus of the present invention on the conventional type of automobile, the automatic release device B is preferably secured under the hood of the car on the forward side of the usual dashboard 96, and the cut-off switch C is secured to the instrument panel 97 in such a way, that the knob 91 is readily accessible and easily manipulable from the face thereof. The pipe 41 desirably extends along the front face of the dashboard 96 on one side thereof, along the chassis frame just above the bottom of the front door opening, and then upwardly along the side of the door jamb 22 into communication with the lock cylinder 20. It is seen therefore that the entire system of the present invention can be so mounted as to be practically concealed from view.

In Fig. 7 is shown another form of the present invention adapted for use in a car, which is not provided with a suction motor or vacuum booster. In this form, the vacuum throughout the system is stabilized by means of a vacuum tank 100, which is desirably mounted under the hood of the car, and which is provided with an automatic valve 101 desirably of the ball type. In the specific form shown, this valve 101 comprises a section 102 of a valve casing connected to the tank 100 by welding or the like, and presenting a valve seat 104 at the end of a passageway 105, which extends between the interior of the tank and the interior of said valve section, and which is controlled by a ball 106. Threaded onto the valve section 102 is a coupling 107, forming the other section of the valve casing, and provided with a valve seat 103. This coupling 107 has connected thereto a pair of branch nipple connections 108 and 109, communicating with the interior of the valve casing by the main axial passageway in said coupling, and by a small recess 110 in the seat 103. Between the branch connection 108 and the valve 45 of the automatic release device B is a fluid connection 111, and between the other branch connection 109 and the intake manifold 13 is a fluid connection 112.

Connected to one side of the tank 100 is one end of a pipe connection 113, the other end of which is connected to the port 64, as is the connection 77 in the construction of Figs. 1 to 6.

In operation, the vacuum in the intake manifold 13 causes the ball 106 to be lifted from the valve seat 104 into engagement with the seat 103, so that the vacuum in said manifold will be transmitted to the tank 100 through the recess 110 and port 105. When the vacuum in the intake manifold has dropped to a predetermined amount, the ball 106 drops onto the valve seat 104, thereby sealing the tank, and preventing the vacuum from being drawn out therefrom. This tank thereby maintains a substantially constant source of vacuum for the operation of the locks, irrespective of any reductions in the vacuum of the intake manifold, as is occasioned when the throttle valve is opened wide as in climbing a steep hill.

The rest of the mechanism shown in Fig. 7 is similar to that shown and described with reference to the construction of Figs. 1 to 6.

Although the operation of the specific embodiments of the invention illustrated in Figs. 1 to 7 is apparent from the foregoing description, this operation is herein briefly summarized.

Assuming that the cut-off valve C is in closed position with the valve chest 88 covering both ports 86 and 87, as soon as the motor is started, the suction created in the valve 45 by the operation of this motor will draw the diaphragm 48 inwardly or downwardly against the action of the spring 57 as shown in Fig. 2, so that the valve 46 will be in the position shown, and the lines 78 and 41 will be under vacuum. This vacuum, transmitted to the cylinder 20 through the pipe 41, will cause the locking bolt 28 therein to move to the right from the position shown in full lines in Fig. 2, into door locking position shown in dotted lines. The door will thereby be locked as long as the motor runs, and the cut-off valve C is kept closed.

As soon as the motor shuts down, the resultant release of the vacuum in the intake manifold will be immediately transmitted to the valve 45, irrespective of the vacuum condition in the booster 12 or the storage tank 100, so that the equalized fluid pressure on opposite sides of the diaphragm 48, will cause the spring 57 to move said diaphragm upwardly or outwardly into position to rotate the valve 68 in a counterclockwise direction until the airport 73 is in registry with the port 65 communicating with the pipe 78. This operation will open the pipe 78 and 41 to the atmosphere, and cause the immediate withdrawal of the bolt 28 into the door released position shown in full lines in Fig. 2.

In both the constructions of Figs. 1 to 6 and Fig. 7, the partially sealed suction chamber of the booster 12, and the tank 100 are substantially air-locked, causing the vacuum therein to die down gradually after the motor is shut down, so that if no automatic release device were provided, the unlocking of the door would be unduly delayed. This delay might be a serious matter in case of an accident to the car or to the operator.

The construction of the present invention not only has the advantage of preventing accidents, as already indicated, but is also useful in avoiding intrusions or hold-ups.

Although two door locks A and A' are shown for the front and rear door on one side of a four door automobile, it must be understood, that the two doors on the other side of the car may be similarly provided with locks, and that all of these locks are operated from a single system, desirably by suitable branch connections from the pipe 41. Since children are usually made to occupy the rear of a car, the locks if desired may be installed only for the rear doors. In the case of a car of the two door type, only the front door farthest from the driver's seat need be provided with a door lock.

As far as certain aspects of the invention are concerned, instead of mounting the door locks on the door jamb, these locks can be installed in the roof or floor of the car, with the strikes in the doors, or the locks may be mounted on the doors with the strikes in the door frame.

In Figs. 8 and 9 is shown a system, operated from the ignition key switch, and comprising a key operated cylinder 120, which may be either of the conventional pin tumbler or wafer type, and which is rotatably enclosed in a housing 121. A rotary switch 122, connected to the rear end of the cylinder 120 by any suitable means, as for instance the tongue and slot connection 123, operates a valve 124 supported from the housing 121. This valve 124 is similar to the valve 46 in the constructions of Figs. 1 to 7, and has its rotary valve plate 68, keyed to a stud 125, the inner end of which is affixed to the switch 122 for rotation therewith. The valve plate 68 is urged against the valve casing 60 by means of a coil spring 126, and is provided with an airport 73, which moves in and out of registry with the port 65 in the valve casing 60 as the key 127 is rotated in position to turn off or turn on the ignition system. The two ports 64 and 65 of the valve casing 60 are connected to the pipes 77 and 78 leading to the source of vacuum and to the cut-off valve C respectively, as in the construction of Figs. 1 to 7.

In the position shown in Figs. 8 and 9, when the ignition is turned off, the airport 73 is in registry with the port 65, so that the lock A will be under atmospheric pressure, and in released position. When the key is turned, for instance one-quarter of a revolution, the valve plate 68 is rotated in a clockwise direction as viewed in Fig. 9, so that the airport 73 will be moved out of registry with the port 65, and the groove 72 will scalably enclose the inner ends of the two ports 64 and 65. In this position, the vacuum from the line 77 will be transmitted to the line 78, and the lock A will be operated into closure position, assuming that the cut-off valve C is in a position reversed from that shown in Fig. 2.

In Figs. 10 and 11 is shown a construction, in which the operation of the system is controlled directly from the ignition key. In this construction there is provided a rotary valve 130, which is similar to the valve 46 of the constructions of Figs. 1–7, and which has a pair of spaced members 131, connected to the valve plate 68, and serving as a guideway for a cross-head 132. Pivotally connected to this cross-head 132 is one end of a lever 133, the other end being pivotally supported at a fixed point 134. This lever 133 is urged in a counter-clockwise direction into contact with the head of a switch key 136, desirably by means of a coil spring 135, fixed at one end and connected to the valve plate 68 at the other end. The switch key 136 fits into the keyhole of the conventional tumbler 137, and when rotated from the position shown in Fig. 10 in which the ignition is turned off, to the position shown in Fig. 11 in which the ignition is turned on, the engagement of the head of this key with the lever 133 causes this lever to swing in a clockwise direction against the action of the spring 135, and causes thereby the counter-clockwise rotation of the valve plate 68.

When the ignition is turned off as shown in Fig. 10, the airport 73 of the valve plate 68 will be in registry with the port 65 of the valve casing 60, so that the pipe 78 conected to said port and leading to the cut-off valve C will be under atmospheric pressure. When the key 136 is rotated in a clockwise direction into the position shown in Fig. 11, to turn on the ignition, the valve plate 68 will be rotated in a counter-clockwise direction, so that the airport 73 will move out of registry with the port 65, and the groove 72 of said plate will move into position to sealably enclose the inner ends of the two ports 64 and 65. In this position, the vacuum in the pipe 77 will be transmitted to the pipe 78, and in turn to the lock A, so that said lock will move into closed position. The valve plate 68 will be locked in this position until the key 136 is returned to the position shown in Fig. 10. In this latter position, a stop 138 engaging the lever 133 prevents said lever from blocking the keyhole.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent, is:

1. A safety device for a vehicle having an internal combustion motor, a substantially stabilized source of accessory operating fluid motive power energized from said motor and functioning throughout the entire period of operation of the vehicle, and in which air lock of the fluid inherently occurs when the vehicle is set out of operation, a door lock operated as one of the accessories, pneumatically operated means therefor connected to said source and venting means in the pneumatic connections responsive to cessation in operation of the motor regardless of the condition of said source and serving to break the air lock, in order to permit prompt opening of the door lock.

2. A safety device for a self-propelled vehicle, in which fluid motive power generated by the propelling unit of the vehicle is retained in a chamber for a limited period after said unit is shut down, comprising a door lock, means responsive to the fluid motive power in said chamber for automatically operating said lock into door locking position when said propelling unit is started, and means automatically operable when said propelling unit is shut down, for releasing said lock irrespective of the fluid condition in said chamber, whereby delays in the release of said lock, incident to gradual extinction of fluid motive power in said chamber is avoided.

3. A safety device for a vehicle, having a substantially stabilized source of fluid motive power generated by a mover, comprising a door lock, means responsive to said fluid motive power for automatically operating said lock in door locking position when said mover is started, and including fluid pressure conduit means between said source and said door lock, a relief valve in said conduit means under direct control of said mover, and means automatically released when said mover is shut down, for opening said relief valve, to exhaust the fluid motive power holding said door lock in closed position.

4. A safety device for a self-propelled vehicle of the type having a substantially stabilized source of fluid motive power generated by the propelling unit of said vehicle, said device comprising a door lock urged into door released position by a spring, means responsive to said fluid motive power from said source for automatically operating said lock to door locking position against the action of said spring when said propelling unit is started, and including fluid pressure conduit means between said source and said door lock, a relief valve in said conduit means, and means under direct control of said propelling unit automatically operable when said propelling unit is shut down, for opening said relief valve, to exhaust the fluid motive power holding said door lock in locking position regardless of the condition of said source, whereby said lock is returned to released position by the action of said spring.

5. A safety device for a motor vehicle, in which vacuum motive power generated by the operation of the motor becomes air-locked in a chamber after said motor is shut down, comprising a door lock, means responsive to the motive power in said chamber for automatically operating said lock into door locking position when said motor is started, and including vacuum transmission conduit means between said chamber and said lock, a relief valve in said conduit means, and means responsive to the interruption of the vacuum on the intake side of said motor regardless of the air lock of said chamber, for opening said relief valve when said motor is shut down, to exhaust the vacuum holding said door lock in closed position.

6. A safety device for a motor vehicle comprising means for creating a substantially stabilized source of vacuum by the operation of the motor, a door lock having a cylinder, a piston, and a spring pressed bolt connected to said piston, one side of said piston being open to the atmosphere, the other side being open to said vacuum, whereby upon the starting of said motor, said bolt will be moved into door locking position against the action of the spring, and means automatically operable when the motor is shut down, for immediately exhausting the vacuum acting on said piston independent of any vacuum remaining at said source after said motor shut-down, whereby said bolt will be moved without delay into door released position under the action of said spring.

7. A safety device for a motor vehicle comprising means for creating a substantially stabilized source of vacuum by the operation of the motor, a door lock operated by said vacuum into door locking position, and means automatically operable upon the shut-down of said motor for immediately moving said door lock into released position, independently of any vacuum remaining at said source after said motor shut-down.

8. A safety device for a motor vehicle, comprising means for creating a substantially stabilized source of vacuum by the operation of the motor, a door lock, means responsive to said vacuum for automatically operating said lock into door locking position when said motor is started, and including vacuum transmission conduit means between said source and said lock, a manually operable cut-off valve for opening to the atmosphere that portion of said conduit means leading to said lock, and valve means automatically operable upon a shut-down of said motor, for opening said portion of the conduit means to the atmosphere to move said door lock into released position.

9. A safety device for a vehicle equipped with a motor, said device comprising a substantially stabilized source of fluid motive power, a spring pressed door lock, means responsive to said motive power for automatically operating said lock into door locking position against the action of its spring, when said vehicle is placed in a certain operating state, and comprising conduit means between said source and said lock, and vent means between said source and said lock, normally closed and automatically opened when the propulsive effort of said motor ceases, for exhausting the motive power from the portion of said conduit means on the inlet side of said lock regardless of the condition of said source, whereby said door lock is released under the action of said spring.

10. A safety device for a self-propelled vehicle, comprising a substantially stabilized source of fluid motive power generated by the operation of the motor, a door lock operated by said fluid motive power, a conduit for transmitting said power from said source to said lock, a relief valve in said conduit having a rotary valve plate, and means automatically operable upon shutdown of said motor for rotating said valve plate regardless of the condition of said source, into position to open the portion of said conduit between said valve and said door lock to the atmosphere.

11. A safety device for a self-propelled vehicle, comprising a substantially stabilized source of fluid motive power generated by the operation of the motor, a door lock operated by said fluid motive power, a conduit for transmitting said power from said source to said lock, a relief valve in said conduit automatically operable regardless of the condition of said source into position to sealably interconnect the valve inlet and valve outlet ends of said conduit when said motor is operating, and means responsive to the interruption of the vacuum on the intake side of said motor when said motor is shut down, for operating said valve into position to open the portion of the conduit between said valve and said door lock to the atmosphere, while cutting off communication between the valve inlet end and valve outlet ends of said conduit.

12. A safety device for a self-propelled vehicle of the type having means for creating a substantially stabilized source of vacuum by the operation of the motor, said device comprising a door lock, means responsive to said vacuum for automatically operating said lock into door locking position when said motor is started, and including vacuum transmission conduit means between said source and said lock, a relief valve in said conduit, a casing communicating with the intake side of said motor, a flexible diaphragm sealing said casing and flexed in accordance with the pressure in said casing, and means between said diaphragm and said relief valve for opening said valve when the suction in the intake of said motor has dropped as the result of the shut-down of the motor.

13. A safety device for a self-propelled vehicle of the type having means for creating a substantially stabilized source of vacuum by the operation of the motor, said device comprising a door lock, means responsive to said vacuum for automatically operating said lock into door locking position when said motor is started, and including vacuum transmission conduit means between said source and said lock, a relief valve in said conduit having a rotary valve plate, a diaphragm valve actuator controlled from the vacuum in the intake side of said motor, and means for rotating said valve plate from the diaphragm movement of said actuator to open the portion of said conduit between said relief valve and said door lock to the atmosphere, when said motor is shut down, regardless of the condition of said source whereby said door lock is moved into released position.

14. A safety device for a vehicle having a motor and having a source of accessory operating fluid motive power functioning throughout the entire period of operation of the vehicle, and in which air lock of the fluid inherently occurs when the vehicle is set out of operation, a door lock operated as one of the accessories, a valve having a casing with a pair of ports, a first piping from said source of power to one of said ports, a second piping from the other port to said door lock, said valve also having a rotary valve plate provided with an air port, and adapted in closed position to effect sealable communication between said ports, and in open position to bring said air port in communication with the port connected to said second piping, while sealing off the other of said pair of ports, and means automatically responsive to cessation in propulsive effort of the motor for moving said valve plate into open position to break said air lock, whereby said door lock will be promptly opened.

15. A safety device for a motor vehicle having an internal combustion motor and a substantially stabilized source of fluid power, including a door lock operated from said source, a valve, a first piping from said source of power to said valve, and a second piping from said valve to said door lock, said valve including means for sealably interconnecting said pipes in one position of the valve, to transmit fluid power from said first piping to said second piping, and means released by said motor upon cessation in the operation thereof for moving said valve to another position for opening said second piping to the atmosphere, while sealing off said first piping.

16. A safety device for a motor vehicle of the type having a vacuum booster operated by the motor, said device comprising a door lock, means responsive to the vacuum created by said booster for automatically operating said door lock into door locking position when said vehicle is placed in a certain operating state, and including conduit means between said booster and said lock, and means including a vent normally closed and opened automatically when the propulsive effort of the vehicle motor ceases, for automatically restoring to atmospheric pressure the door lock operating means, irrespective of the vacuum condition in said booster.

17. A safety device for a motor vehicle, of the type having an internal combustion motor with an intake manifold and having a vacuum booster operated by said motor, said device comprising a door lock, means responsive to the vacuum created by said booster for automatically operating said lock into door locking position when said motor is started, a vent controlling valve associated with said door lock operating means and closed while the door is locked, and suction operated means under direct control of the intake manifold for opening said vent as soon as the motor shuts down and thereby promptly releasing said lock.

18. A safety device for a motor vehicle including a vacuum tank connected to the intake of the motor, and having a valve means whereby a vacuum is maintained in said tank irrespective of reductions in the intake manifold caused by the laboring of the motor, a door lock, means operable from the vacuum in said tank for automatically operating said lock into door locking position when said motor is started, and valve means under direct control of the motor, irrespective of said tank for automatically releasing said door lock without delay, when the motor is shut down, irrespective of the vacuum in said tank.

19. A safety device for a motor vehicle comprising an internal combustion motor, a source of fluid motive power energized from said motor, a lock, conduit means between said source and said lock for operating said lock from said source, a relief valve in said conduit means, and opening means for said valve, under direct control of the motor, and held in inactive position while said motor operates, and moved into valve closing position upon shut-down of said motor.

ABRAHAM E. CHESLER.